United States Patent [19]

Hagio et al.

[11] Patent Number: 5,063,184

[45] Date of Patent: Nov. 5, 1991

[54] PRESSURELESS SINTERED BODY OF BORON NITRIDE

[75] Inventors: Tsuyoshi Hagio; Kazuo Kobayashi, both of Tosu; Hisayoshi Yoshida, Ogoori; Ichitaro Ogawa, Tosu; Hiroshi Harada, Omuta; Hiroaki Yasunaga, Omuta; Hiroshi Nishikawa, Omuta, all of Japan

[73] Assignees: Agency of Industrial Science and Technology, Tokyo, Japan; Denki Kagaku Kogyo Kabushiki Kaisha, Tokyo, Japan

[21] Appl. No.: 501,318

[22] Filed: Mar. 27, 1990

Related U.S. Application Data

[63] Continuation of Ser. No. 294,695, filed as PCT JP88/00339 on Apr. 1, 1988, published as WO88/07504 on Oct. 6, 1988, abandoned.

[30] Foreign Application Priority Data

Apr. 1, 1987 [JP] Japan ................................. 62-082097
Aug. 31, 1987 [JP] Japan ................................. 62-218347

[51] Int. Cl.$^5$ ............................................. C04B 35/58
[52] U.S. Cl. ........................................ 501/96; 501/98; 423/290
[58] Field of Search .................... 501/96, 98; 423/290

[56] References Cited

U.S. PATENT DOCUMENTS

| | | | |
|---|---|---|---|
| 4,188,194 | 2/2980 | Corrigan | 51/309 X |
| 4,539,300 | 9/1985 | Coblenz | 501/98 |
| 4,634,640 | 1/1987 | Hunold et al. | 423/290 X |
| 4,784,978 | 11/1988 | Ogasawara et al. | 423/290 X |
| 4,960,734 | 10/1990 | Kanai et al. | 501/96 X |

FOREIGN PATENT DOCUMENTS

| | | | |
|---|---|---|---|
| 0154992 | 9/1985 | European Pat. Off. | 501/96 |
| 12547 | 7/1963 | Japan . | |
| 17676 | 7/1968 | Japan . | |
| 38047 | of 1972 | Japan . | |
| 116181 | 7/1984 | Japan . | |
| 132563 | 6/1986 | Japan . | |
| 12195 | 3/1987 | Japan . | |

OTHER PUBLICATIONS

Journal of Electron Spectroscopy and Related Phenomena, 27 (1982), pp. 234-254 of Jun Hosoi, Tetsuo Oikawa and Masao Inoue Title: "Study of Boron Nitride by Electron Energy Loss Spectroscopy".

Ann. Chim. Fr., 1985, vol. 10, pp. 607-638 by Eliezer Rapoport Title: "Cubic Boron Nitride-A Review".

Primary Examiner—Karl Group
Attorney, Agent, or Firm—Darby & Darby

[57] ABSTRACT

A pressureless sintered body of boron nitride contains more than 95 wt% of boron nitride. The pressureless sintered body hexagonal of boron nitride has a density of not less than 1.10 g/cm$^3$ and a bending strength of not less than 300 kg/cm$^2$. A process of producing the pressureless sintered body of boron nitride comprises pulverizing powders of starting feed boron nitride so that a specific surface area of each of the powders is two times or more than that of the starting feed boron nitride powder, molding the thus pulverized powders to obtain a pre-molded body and sintering the pre-molded body at a temperature of not less than 1400° C. under atmospheric pressure and under non-oxidative atmosphere.

8 Claims, 1 Drawing Sheet

FIG.
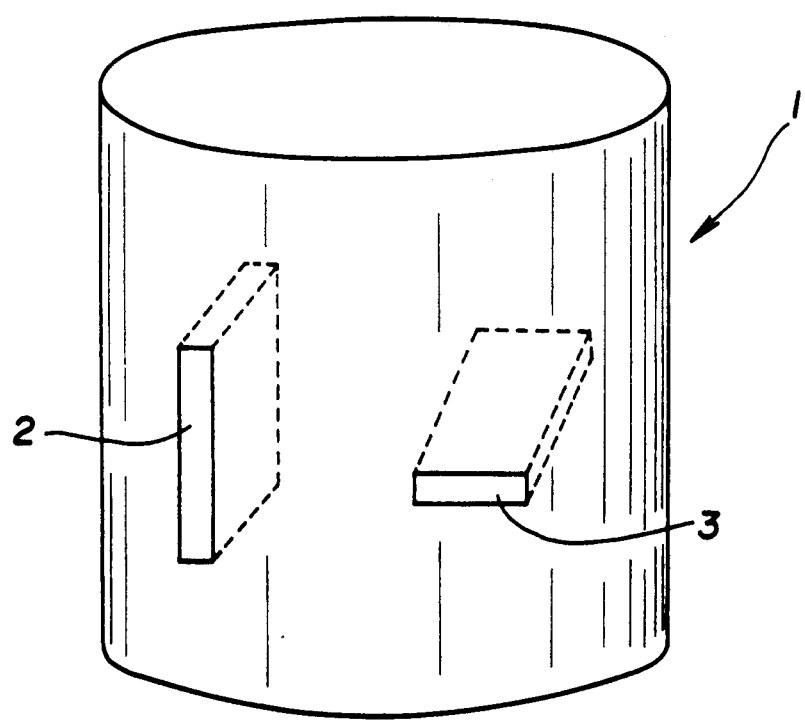

PRESSURELESS SINTERED BODY OF BORON NITRIDE

This is a continuation of application Ser. No. 294,695, filed as PCT JP88/00339 on Apr. 1, 1988, published as WO88/07504 on Oct. 6, 1988, abandon.

FIELD OF ART

The present invention relates to a pressureless sintered body of boron nitride having high thermal conductivity and high electric insulation and suited for use as a material for a heat sink and the like, and to a process for producing the same.

BACKGROUND OF ART

Boron nitride (hereinafter referred to as BN) is one of rare ceramics having excellent characteristics, such as electric insulation, thermal conductivity, resistance to corrosion, resistance to thermal shock and lubricating property, and adapted to be easily machined. For this reason, it is widely used as a material for various containers for melting metals therein, electrically insulating materials and heat conductor materials used at high temperature, for which the aforementioned properties are required.

Since BN is hardly sintered, sintered bodies of BN are generally produced by the hot press method (sintering under pressure). In practice, a pressure more than 100 kg/cm$^2$ must be applied at a temperature of from 1500 to 2300° C., which necessitates the use of graphite dies to thus make it impossible to form a large molded body. There is also a problem that the efficiency of mass production of articles of complicated shape is lowered.

Even in press sintering methods, such as in the hot press method, it is a common practice to add a sintering aid, such as boron oxides or borates of alkaline earth metals. However, because such a sintering aid remains in the hot press sintered body, it causes to deteriorate characteristics inherent to BN such as lubricating property, electrically insulating property, thermal conductivity and resistance to thermal shock at elevated temperatures, and thus the sintering aid is deemed a harmful component contained in the final sintered body. Moreover, since the BN powder has hexagonal crystallite lamellar structures which tend to be easily oriented at the molding step, the hot press sintered body thereof has anisotropic properties and the use thereof is limited sometimes. Although it has been tried, for example, to effect rubber press molding at a pre-molding step and then the pre-molded mass is put into a graphite mold and sintered under the condition of limiting free expansion (Japanese Laid-Open Patent publication No. 132563/1986) in order to produce an isotropic sintered body, such a process is low in production efficiency in addition to the aforementioned problem caused by the sintering aid.

Although various pressureless sintering processes have been tried to solve these problems, a sintered body of high purity and high strength exhibiting the properties of BN a sufficient extent has not yet been produced. For example, Japanese Patent Publication No. 12547/1963 discloses a process wherein boric anhydride is added to BN and then pressurelessly sintered. However, the product produced thereby has little practical utility since the content of BN is as high as 95 to 99 wt. % but the strength thereof is as low as 5 kg/cm$^2$. On the other hand, Japanese Patent publication No. 38047/1972 describes a process in which SiO$_2$ and B$_2$O$_3$ are added to BN. However, although the product produced thereby has high strength of from 350 to 700 kg/cm$^2$, the content of BN is as low as in the order of 30 to 70 wt. %, leading to the failure of satisfactory exhibition of properties of BN, and particularly the product is not suited for an insulating material or a crucible for melting metals which must have an electrically insulating property, thermal conductivity, resistance to corrosion and resistance to thermal shock.

As the electric equipments are progressively smaller and highly integrated, problems arise in conduction and radiation of heat generated from the circuit elements and there is a demand for an electrically insulated heat sink (hereinafter referred simply to as "heat sink") having sufficient insulating property, high thermal conductivity and high mechanical strength.

Inexpensive alumina has conventionally been used for the heat sink. However, since thermal conductivity of alumina is not sufficiently high, BN has been adopted in lieu of alumina in recent years to cope with the radiation of heat from a high power electronic equipment. However, since BN is sintered mainly through the hot press method, the sintered ingot must be post-machined to have a desired shape which requires labor and poses a problem that the insulation resistance and thermal conductivity are lowered due to the addition of a sintering aid. It is also another big problem that the insulating resistance is lowered by absorption of moisture by the sintering aid in the sintered body. For example, a method of coating a resin on a sintered body is disclosed (Japanese Laid-Open Patent Publication No. 116181/1984) in order to improve the anti-hygroscopic property of the sintered body, but there is a problem that a layer of low thermal conductivity is formed on the surface to lower the thermal conductivity although the anti-hygroscopic property is improved.

For these reasons, there is a demand for the provision of a pressureless sintered body of BN having high purity and high strength and a process for producing the same which is excellent in characteristics inherent to BN such as electrically insulating property, thermal conductivity, resistance to corrosion, resistance to thermal shock and lubricating property without adding any sintering aid.

The object of this invention is to improve the strength and other properties of a pressureless sintered body of BN and to provide a presssureless sintered body of BN having high purity and high strength and having satisfactory thermal conductivity and electrically insulating property, which have not been obtainable by the conventional technology.

DISCLOSURE OF THE INVENTION

According to this invention, there is provided a pressureless sintered body of hexagonal boron nitride comprising more than 95% by weight of boron nitride, the sintered body having a density of not less than 1.10 g/cm$^3$ and a bending strength of not less than 300 kg/cm$^2$.

According to this invention, there is also provided a process for producing a pressureless sintered body of boron nitride, comprising pulverizing powders of starting feed boron nitride so that a specific surface area of each of the powders is two times or more than that of the starting feed boron nitride powder, molding the thus pulverized powders to obtain a pre-molded body and sintering the pre-molded body at a temperature of not less than 1400° C. under atmospheric pressure and under non-oxidative atmosphere.

BRIEF DESCRIPTION OF THE DRAWING

The Figure is an illustrative view showing the way for taking up samples for measuring the bending strength and for measuring the thermal conductivity.

PREFERRED EMBODIMENTS TO PRACTICE THE INVENTION

The present invention will now be described in detail hereinbelow.

Although commercially available products may be used as the BN powders used in this invention, it is desirous to use powders of hexagonal boron nitride which is highly crystallizable. The highly crystallizable boron nitride powders of hexagonal structure are preferred since they are excellent in plastic deformability at the pre-molding step so that a high density pre-molded body can be easily obtained therefrom.

Although it was already tried to sinter under pressureless condition BN fine powders produced by a synthesis process or BN powders which had been produced by crushing highly crystallized BN, a sintering aid was added in any of the conventional pressureless sintered bodies and it was impossible to sinter the BN powders under pressureless condition without any additive. In this invention, these generally synthesized and commercially available BN powders of starting feed materials, which cannot be sintered singly under a pressureless condition, are pulverized by crushing, shearing or grinding so that a specific surface area of each of the powders is two times or more than that of the starting feed BN powder, whereby adaptability for sintering the BN powders is improved to make it possible to sinter the same under a pressureless condition. As the apparatus for pulverization, well-known pulverizers of conventional types, such as attrition mill, ball mill, vibrating ball mill and mortar mill, may be used. Pulverization is effected so that each of the powders is pulverized to have a specific surface area of two times or more, preferably ten times or more, than that of the starting feed BN powder. It becomes difficult to obtain a pressureless sintered body if the surface area of each of the pulverized powders is less than 2 times than that of the starting feed powder.

Boron oxide is formed if pulverization is carried out in an oxidative atmosphere, and cracks are formed in the sintered body when the powder is directly subjected to sintering without any treatment. In such a case, the powders can be used as a feed material in this invention by subjecting them to treatment for removing boron oxide. Methods of removing boron oxide include, for example, treatment thereof with an alcohol such as methanol, ethanol or glycerin. Specifically, a slurry containing alcohol is subjected to heating treatment or it is rinsed with alcohol and filtered. However, any measure for removing the aforementioned boron oxide is not required when pulverization is effected in a non-oxidative atmosphere, for example in $N_2$ or Ar, to prevent formation of boron oxide.

The BN powders pulverized in accordance with the process of this invention have advantage that they can be sintered under a pressureless condition without the addition of any sintering aid. It is estimated that activated powders are formed by a so-called mechano-chemical effect due to the progress of deformation faults in crystalline lattice and development of partial amorphous phase accompanied by formation of new particle surfaces. A further advantage is that there is only little dimensional change before and after the sintering step when BN powders pulverized in the manner as aforementioned are used.

The thus pulverized powders are molded to obtain a pre-molded body. It is desirous that a pre-molded body is molded by a cold isostatic press molding method, for example, a rubber press method wherein powders filled in a rubber mold are pressed isostatically to effect compression molding, or by an uni-axial press molding method such as a mold pressing method, or by a slip casting method. In order to obtain a pressureless sintered body of BN having high strength, it is desirous that the molding pressure be raised as high as possible to increase the density of the pre-molded body. An anisotropic sintered body is obtained by using powders of boron nitride having hexagonal structure which is high in crystallization as the starting feed powders, which are molded by the uni-axial press molding method. An isotropic sintered body is obtained by the cold isostatic press molding method. An isotropic sintered body is also obtained by using BN powders which are not crystallized so highly as the starting feed powders, and the powders are molded by the uni-axial press molding method.

The isotropic sintered body is defined as a sintered body in which the ratio between the smallest bending strength along one of the three-dimensional axes X, Y, Z, i.e. the axes X, Y, Z which extend in the directions perpendicular to one another, to the largest bending strength along one of the axes X, Y, Z is within the range of from 0.80 to 1.0; and the anisotropic sintered body is defined as a sintered body in which the aforementioned ratio is less than 0.80.

Sintering is effected at a temperature of not less than 1400° C. in a non-oxidative atmosphere under a pressureless condition. If the sintering temperature is less than 1400° C., oxygen, boron oxide and impurity elements cannot be removed and it becomes difficult to obtain a sintered body of hexagonal BN of high purity containing more than 95 wt. % of BN. In addition, since it is difficult to bind the BN particles directly, a sintered body of BN having high strength cannot be formed. It is desirous that sintering be effected at a temperature of not less than 1800° C. in a non-oxidative atmosphere since a sintered body of BN having particularly high purity is formed. The atmosphere in which sintering is effected may be an atmosphere of an inactive gas, such as He, Ar or $N_2$, a reducing atmosphre or in vacuum. Examples of sintering apparatus for forming the sintered body of this invention include Tanmann furnace, resistance heating furnace and high frequency heating furnace.

The pressureless sintered body of BN according to this invention will now be described.

The pressureless sintered body of BN contains BN having the purity of more than 95 wt. %. If the purity is not more than 95 wt. %, the inherent characteristics of BN, such as high thermal conductivity, electrically insulating property and resistance to corrosion, are disadvantageously deteriorated. It is desirous that the purity be not less than 98 wt. % so that the aforementioned properties are sufficiently exhibited. The sintered body should have a density of not less than 1.10 g/cm$^3$ If the density is less than 1.10 g/cm$^3$, the body is not dense due to the presence of many pores, with the result that the bending strength and the thermal conductivity thereof are not improved so as not to be suited for use as a material for a heat sink or the like. A more preferable density is not less than 1.60 g/cm³ since the bending strength and thermal conductivity are significantly improved. The largest bending strength along one of the three-dimensional axes X, Y, Z should be not less than 300 kg/cm² If it is less than 300 kg/cm², it becomes impossible to use the sintered body as a structural member since the body is cracked by clamping at a normal temperature and there arise problems that the sintered body is warped at high temperature or lowered in resistance to thermal shock. In a pressureless sintered body of BN having anisotropic property having a ratio of the smallest bending strength along one of the three-dimensional axes X, Y, Z to the largest bending strength along one of the axes X, Y, Z of less than 0.80, BN particles are oriented along a certian direction so that the sintered body has the characteristics that the thermal conductivity and the strength along the certain direction are high.

The pressureless sintered body of BN, according to this invention, has a thermal resistance of not more than 0.4° C/W and an insulation resistance of not less than $10^{10}\Omega$ (Shape: $20\phi \times 1.17t$ (mm)) and has improved characteristics when used for a heat sink. It is high in purity and excellent in moisure-proof property. In addition to the excellent properties adapted for use as a heat sink, no substantial dimensional change is found before and after the sintering step so that the sintered body may be directly used as a finished product by sintering a mass molded to have a shape of a heat sink.

As described above, a pressureless sintered body which is high in purity of BN and has high density, bending strength and thermal conductivity can be produced according to this invention without adding any sintering aid. An inexpensive sintered body of BN having high purity and high strength and excellent in inherent characteristics of BN, including electric insulating property, high thermal conductivity, resistance to corrosion, resistance to thermal shock and lubricating property, which have hitherto been earnestly demanded, can be produced at high production efficiency. Isotropic or anisotropic pressureless sintered bodies of BN may be obtained by molding through the cold isostatic press molding method or uni-axial press molding method at the pre-molding step, and they may be applied for uses to exhibit their respective characteristics.

EXAMPLES

Although the present invention will be described in detail referring to examples thereof and comparative examples in the following description, the present invention should not be limited to the following examples.

EXAMPLE 1

Seven grams of BN powders (Grade GP produced by Denki Kagaku Kogyo KK having a hexagonal structure, a purity of BN of 99.0% and a specific surface area of 6 m²/g) were pulverized in a mortar mill in the normal air atmosphere to have a specific surface area of 60 m²/g, and then rinsed with methanol followed by drying to obtain molding powders. The specific surface area was determined by the BET method.

The powders were molded through the uni-axial press molding method under a pressure of 2000 kg/cm². The thus obtained pre-molded body was buried in the BN powders (Grade GP produced by Denki Kagaku Kogyo KK as described above) filled in a graphite container, and sintered in a high frequency heating furnace at 2000° C. in an atmosphere of Ar for 60 minutes. A random lateral sample 2 and a random longitudinal sample 3 were cut out from the thus obtained sintered body 1 of BN, as shown in the Figure, and the purity, bending strength, thermal resistance and insulation resistance of each sample were measured.

EXAMPLE 2

Using the molding powders prepared in Example 1, the similar procedure as described in Example 1 was carried out except that the sintering temperature was changed to 1800° C.

EXAMPLE 3

Using the molding powders prepared in Example 1, the similar procedure as described in Example 1 was carried out except that the sintering temperature was changed to 1400° C.

EXAMPLE 4

100g of the BN powders used in Example 1 were pulverized in an attrition mill in N² atmosphere to have a specific surface area of 70 m²/g to obtain molding powders. The similar procedure as described in Example 1 was carried out except that the pulverized powders were used and that the sintering temperature was changed to 1800° C.

EXAMPLE 5

100g of the BN powders used in Example 1 were pulverized in an attrition mill in air atmosphere to have a specific surface area of 15 m²/g, followed by rinsing with methanol and drying, to obtain molding powders. The similar procedure as described in Example 1 was carried out except that the pulverized and rinsed powders were used.

EXAMPLE 6

The similar procedure as described in Example 1 was carried out except that a cold isostatic press molding method under a pressure of 2000 kg/cm² was carried out in place of the uni-axial press molding method under the pressure of 2000 kg/cm² of Example 1.

EXAMPLE 7

Boric acid and melamine were mixed in a ratio of 1:1 by weight, and the mixture was heated in an ammonia gas stream at 1200° C. for 4 hours, whereby BN powders each having a purity of BN of 90% and a specific surface area of 50 m²/g were obtained. The result of X-ray diffraction of the powders revealed that the thus formed BN was amorphous.

After pulverizing 7 g of the powders in a mortar mill in air atmosphere to have a specific surface area of 150 m²/g, the powders were rinsed with methanol and then dried to obtain molding powders. The similar procedure as described in Example 1 was carried out except that the thus obtained powders were used.

EXAMPLE 8

Using the molding powders prepared in Example 7, the similar procedure as described in Example 1 was carried out except that the sintering temperature was changed to 1600° C.

EXAMPLE 9

100g of the synthesized BN powders (Purity of BN: 90%, Specific Surface Area: 50 m²/g, amorphous) prepared in Example 7 were pulverized in a vibrating ball mill in an atmosphere of Ar to have a specific surface area of 130 m²/g to obtain molding powders. Using the thus obtained molding powders, the similar procedure as described in Example 1 was carried out except that the sintering temperature was changed to 1800° C.

EXAMPLE 10

Using the molding powders prepared in Example 7, the similar procedure as described in Example 1 was carried out except that the molding pressure was changed to 1000 kg/cm² and the sintering temperature was changed to 1600° C.

COMPARATIVE EXAMPLE 1

The similar procedure as described in Example 1 was carried out except that the synthesized BN powders (Purity of BN: 90%, Specific Surface Area: 50 m²/g, amorphous) prepared in Example 7 were used directly as molding powders without pulverizing the same.

COMPARATIVE EXAMPLE 2

The similar procedure as described in Example 1 was carried out except that the BN powders used in Example 1 were used directly as molding powders without pulverizing the same.

COMPARATIVE EXAMPLE 3

7 g of the synthesized BN powders (Purity of BN: 90%, Specific Surface Area: 50 m²/g, amorphous) prepared in Example 7 were pulverized in a mortar mill in air atmosphere until the secondary particles were crushed, and then rinsed with methanol and dried to obtain molding powders.

The powders had an average particle size of 0.5 μm and a specific surface area of 70 m²/g. The similar procedure as described in Example 1 was carried out except that the thus obtained powders were used and the sintering temperature was changed to 1600° C.

COMPARATIVE EXAMPLE 4

Using the molding powders prepared in Example 1, the similar procedure as described in Example 1 was carried out except that the sintering temperature was changed to 1200° C.

Table 1 shows the results of measurement of physical properties of Examples 1 to 10 and Comparative Examples 1 to 4. The bending strengths and thermal conductivities along the longitudinal and lateral directions of the sintered bodies of Example 1 and Example 6 were measured. The results are shown in Table 2.

TABLE 1

| | Purity of BN (%) | Density (g/cm²) | Bending Strength (kg/cm³) Largest | Bending Strength (kg/cm³) Smallest | Strength Ratio | Thermal Resistance (°C./W) | Insulation Resistance (Ω) Before Absorbing Moisture | Insulation Resistance (Ω) After Absorbing Moisture |
|---|---|---|---|---|---|---|---|---|
| Example 1 | 99.6 | 1.69 | 480 | 320 | 0.67 | 0.24 | $10^{13}$ | $10^{12}$ |
| Example 2 | 98.3 | 1.72 | 530 | 330 | 0.62 | 0.24 | $10^{13}$ | $10^{12}$ |
| Example 3 | 96.3 | 1.80 | 370 | 290 | 0.78 | 0.27 | $10^{13}$ | $10^{12}$ |
| Example 4 | 99.2 | 1.75 | 520 | 400 | 0.77 | 0.23 | $10^{13}$ | $10^{12}$ |
| Example 5 | 99.5 | 1.68 | 320 | 250 | 0.78 | 0.25 | $10^{13}$ | $10^{12}$ |
| Example 6 | 99.7 | 1.70 | 430 | 400 | 0.93 | 0.26 | $10^{13}$ | $10^{12}$ |
| Example 7 | 99.5 | 1.40 | 350 | 300 | 0.85 | 0.27 | $10^{13}$ | $10^{12}$ |
| Example 8 | 95.5 | 1.50 | 510 | 430 | 0.84 | 0.28 | $10^{13}$ | $10^{12}$ |
| Example 9 | 98.0 | 1.61 | 450 | 370 | 0.82 | 0.25 | $10^{13}$ | $10^{12}$ |
| Example 10 | 96.0 | 1.12 | 330 | 300 | 0.91 | 0.25 | $10^{13}$ | $10^{12}$ |
| Com. Ex. 1 | 99.2 | 1.00 | 160 | 80 | 0.50 | Broken upon Clamping | — | — |
| Com. Ex. 2 | 99.7 | 1.62 | 30 | 20 | 0.67 | Broken upon Clamping | — | — |
| Com. Ex. 3 | 95.5 | 1.35 | 100 | 60 | 0.60 | Broken upon Clamping | — | — |
| Com. Ex. 4 | 92.5 | 1.63 | 320 | 240 | 0.75 | 0.40 | $10^{9}$ | $10^{8}$ |

TABLE 2

| | Bending Strength Longitudinal | Bending Strength Lateral | Thermal Conductivity (cal/cm · sec · °C.) Longitudinal | Thermal Conductivity (cal/cm · sec · °C.) Lateral |
|---|---|---|---|---|
| Example 1 | 480 | 320 | 0.09 | 0.13 |
| Example 6 | 430 | 400 | 0.09 | 0.10 |

The purities of BN and physical properties of the sintered bodies of BN as set forth in Tables 1 and 2 were determined by the following methods.

(1) Purity of BN — Alkali Fusion-Neutralization Titration Method (2) Density — The dimensions of each sintered body were measured to learn the volume thereof and the weight was measured. The density was calculated from the equation of: Density $(g/cm^3)$ = Weight(g)/Volume$(cm^3)$ (3) Bending Strength at Normal Temperature — A sample from each sintered body was subjected to measurement carried out generally in accordance with JIS R 1601 Method.

(4) Thermal Resistance — The thermal conductivity of each sintered body, when used as a heat sink, was appraised by the following method.

A sintered body having a shape of 20φ × 1.17t (mm) was put into a Teflon frame and clamped between a Transistor-2SD-375 and a fin under a clamping pressure of 5 kgf•cm and then electric power was applied. The temperatures of the transistor and the fin were measured, and the thermal resistance (° C/W) was calculated from the difference in temperature and the applied electric power.

(5) Insulation Resistance — In order to appraise the electric insulation property of each sintered body, using a sintered body having the same shape as described in (4) (20φ × 1.17t (mm)), the insulation resistance (Ω) thereof was measured immediately after sintering and after it was stored for more than 24 hrs in a desiccator containing a $(NH_4)_2SO_4$ solution to absorb moisture.

(6) Thermal Conductivity — Laser Flash Method

We claim:

1. A pressureless sintered body of hexagonal boron nitride consisting essentially of more than 95% weight of boron nitride and not more than 5% of weight of impurities inevitably contained therein containing boron oxide and oxygen, said sintered body or boron nitride having a hexagonal structure, a density ranging between about 1.10 and about 1.80 g/cm$^3$ and a bending strength of not less than 300 kg/cm$^2$, and said sintered body being obtained by pulverizing powders of starting feed hexagonal boron nitride so that a specific surface area of each of said powders is at least two times that of the starting feed boron nitride powder, molding the pulverized powders to obtain a pre-molded body and sintering the pre-molded at a temperature of at least 1400° C. under atmospheric pressure and under a non-oxidative atmosphere.

2. The pressureless sintered body of boron nitride according to claim 1, wherein said sintered body is a heat sink having electric insulation.

3. The pressureless sintered body of boron nitride according to claim 1, wherein a ratio of smallest bending strength along one of three dimensional axes X, Y and Z to largest bending strength along one of said axes X, Y and Z is less than 0.80.

4. The pressureless sintered body of boron nitride according to claim 3, wherein said sintered body is a heat sink having electric insulation.

5. The pressureless sintered body of boron nitride according to claim 1, wherein a ratio of smallest bending strength along one of three dimensional axes X, Y and Z to largest bending strength along one of said axes X, Y and Z is within the range of not less than 0.80 and not more than 1.0.

6. The pressureless sintered body of boron nitride according to claim 5, wherein said sintered body is a heat sink having electric insulation.

7. The pressureless sintered body of hexagonal boron nitride according to claim 1, made by molding said pulverized powders with a cold isostatic press molding method.

8. The pressureless sintered body of hexagonal boron nitride according to claim 1, wherein said pulverized powders are molded by a uni-axial press molding method.

* * * * *